Oct. 25, 1966  L. MAGERS, JR  3,280,855
REINFORCING CAGE APPARATUS
Original Filed June 25, 1962  3 Sheets-Sheet 1
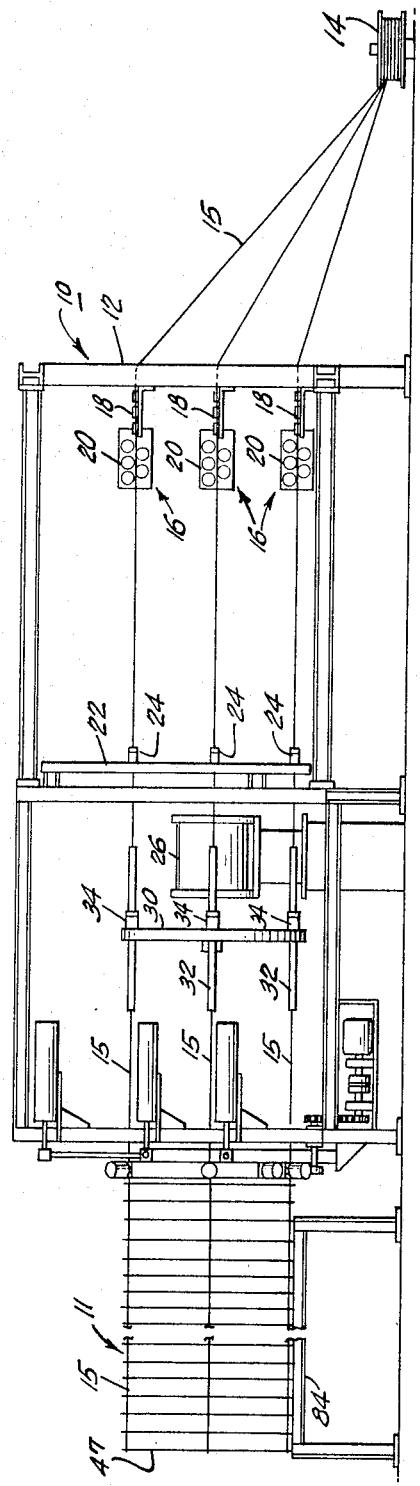
INVENTOR.
LEROY MAGERS, JR.
BY Curtis, Morris & Safford
ATTORNEYS Oct. 25, 1966 L. MAGERS, JR 3,280,855
REINFORCING CAGE APPARATUS
Original Filed June 25, 1962 3 Sheets-Sheet 2
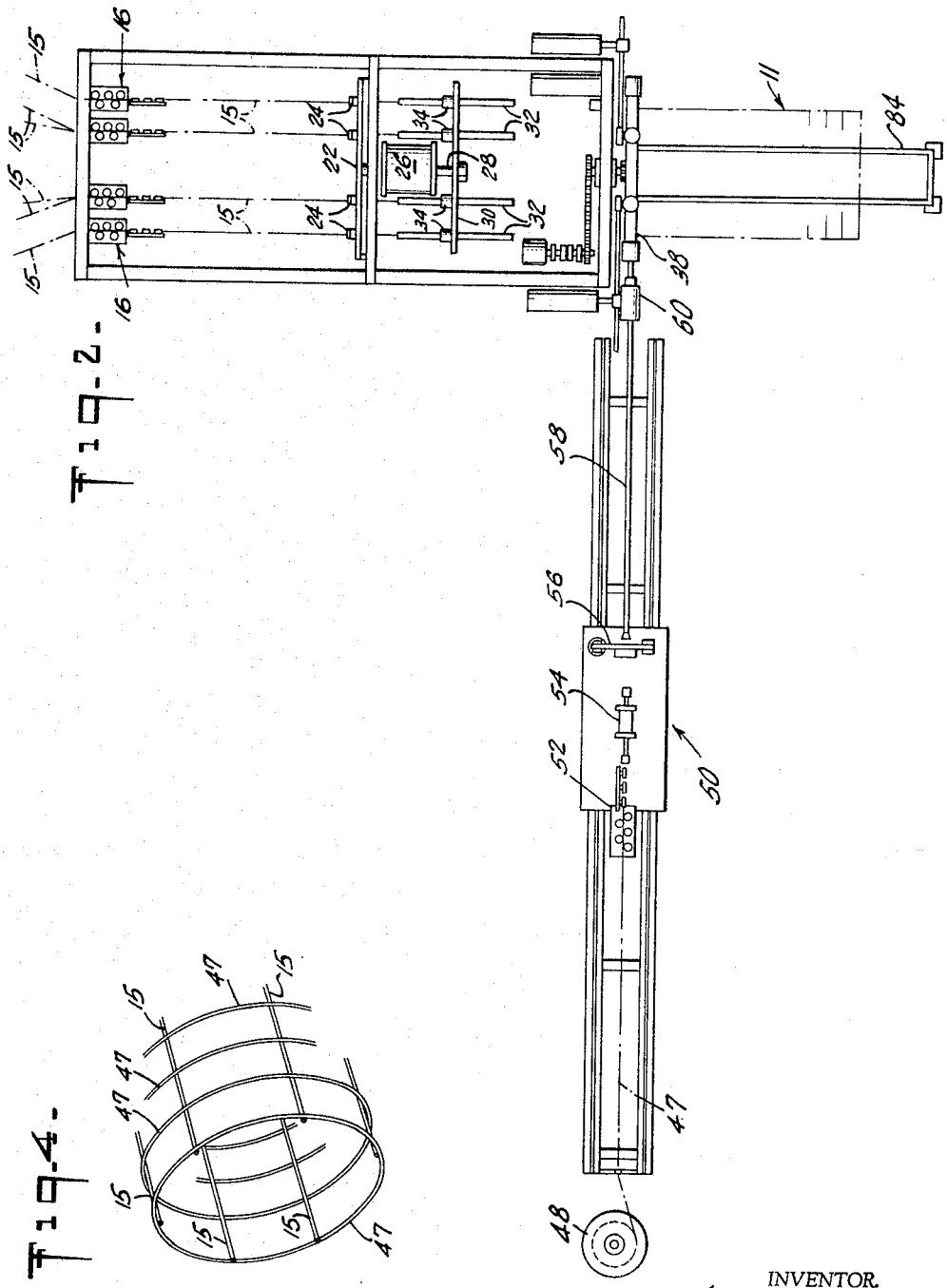
INVENTOR.
LEROY MAGERS, JR.
BY Curtis, Morris & Safford
ATTORNEYS Oct. 25, 1966   L. MAGERS, JR   3,280,855
REINFORCING CAGE APPARATUS
Original Filed June 25, 1962   3 Sheets-Sheet 3
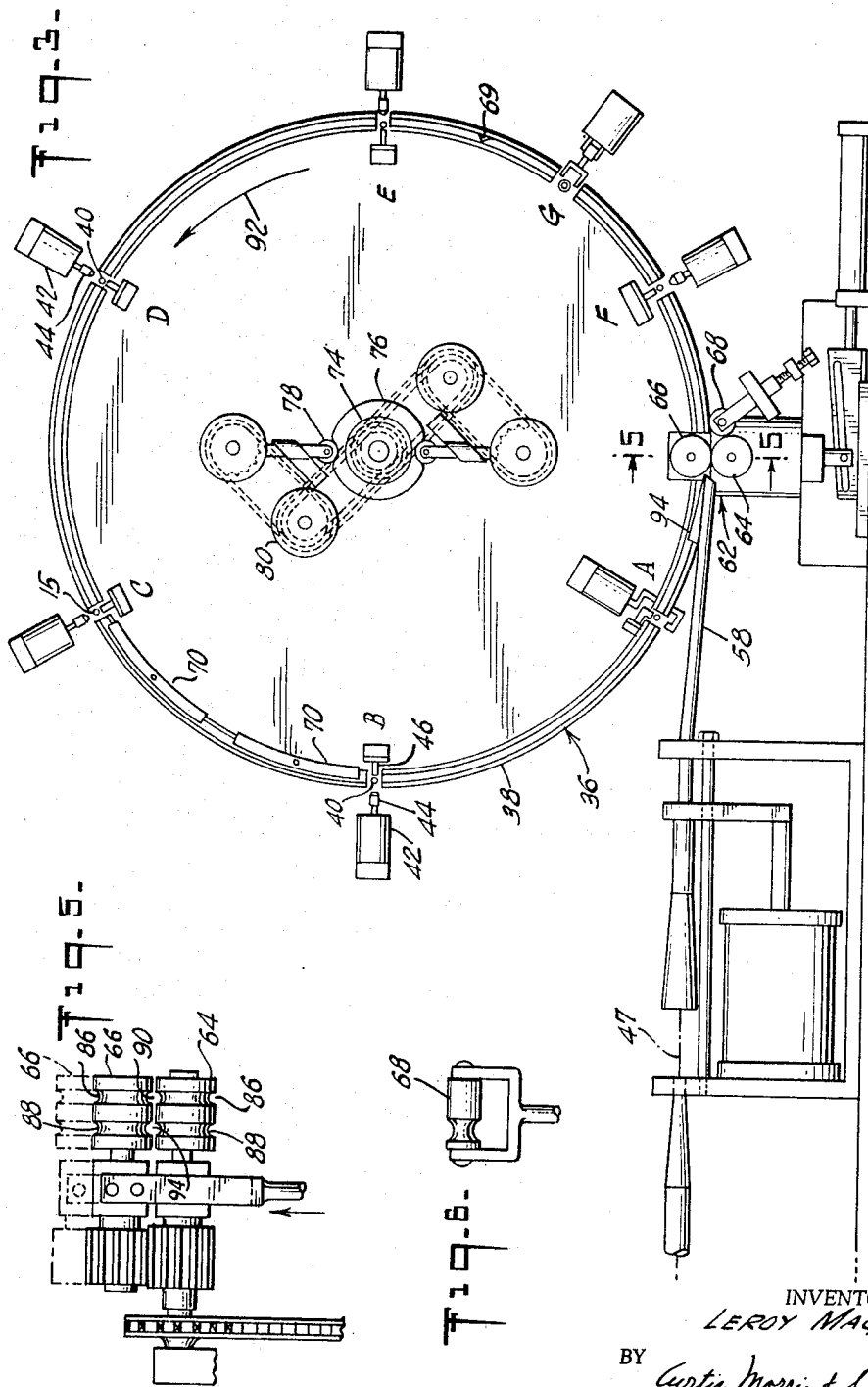
INVENTOR.
LEROY MAGERS, JR.
BY Curtis, Morris & Safford
ATTORNEYS

United States Patent Office 3,280,855
Patented Oct. 25, 1966

3,280,855
REINFORCING CAGE APPARATUS
Leroy Magers, Jr., 37 Laurel Place,
West Caldwell, N.J.
Original application June 25, 1962, Ser. No. 204,808.
Divided and this application July 29, 1965, Ser. No. 484,158
4 Claims. (Cl. 140—112)

This application is a division of application, Serial No. 204,808, filed June 25, 1962, for Reinforcing Cage Apparatus and Method of Making.

This invention relates to a method of making reinforcing cages for concrete pipes as well as apparatus particularly suited to carrying out this method.

Reinforced concrete pipe has many uses and it comes in various lengths and sizes. Basically, the pipe consists of a cylindrical cage formed from reinforcing elements, usually heavy gauge steel wires or rods, and a concrete covering about the cage. The cage usually is made up from a series of spaced longitudinal rods or wires surrounded by hoops of steel rods or wires. Heretofore, the usual method of making these cages has been to select a mesh grid work of steel rods or wires and to roll the selected piece of mesh into cylinder form. The cylinder shape was maintained by tack welding the overlapping portions of the mesh wires or rods together, normally the wires or rods which had been rolled into a hoop. This method was not only slow, time and labor consuming, but it also required the stockpiling of sheets of mesh of various lengths and widths to accommodate the several diameters and lengths of pipe required.

As far as it is known to me, there has not been a commercially available method or apparatus for continuously making cages having individual reinforcing hoops for various lengths and diameters of pipe from a supply of reinforcing material such as spools or coils of wire or rod.

The objects and advantages of a method and apparatus for making cages from spools or coils of wire or rod are many. Such an apparatus eliminates manually or mechanically lifting and rolling of sheets of mesh from one of several sized stockpiles to form the desired cage. It further eliminates the stockpile and high inventory of assorted sizes of mesh. Further, by merely adjusting template and guides it is possible to obtain cages of various diameters. Also, by adjusting the spacing between hoops the reinforcing steel area per square foot may be increased or decreased as required to meet the desired specifications. Further, by adjusting a cut-off mechanism cages of various lengths may also be made. Thus, the present invention has the objects and advantages of being economical from a labor viewpoint and material investment, as well as permitting high speed machine manufacture of cages.

In the accompanying drawings, a preferred embodiment of the present invention is shown and this embodiment is described in detail in the specification. However, it is to be understood that the drawings and the specifications are not intended to be either exhaustive or limiting of the present invention in a method and apparatus for making reinforcing cages for concrete pipes. On the contrary, they are for the purpose of illustrating and describing the invention in order that others skilled in the art may fully understand the invention, its principles and the application thereof, so that they may adapt it in numerous forms and ways, each as may be best suited to the requirements of a particular use within the scope and spirit of the claims set forth hereinafter.

In the drawings:
FIGURE 1 is a side view of a machine in accordance with the present invention;
FIGURE 2 is a top view of the machine of FIGURE 1;
FIGURE 3 is an enlarged front view of the loop forming and welding apparatus of the machine of FIGURE 1;
FIGURE 4 is a fragmentary perspective view of a cage made on the machine of FIGURE 1;
FIGURE 5 is a detail of the roller assembly of the loop mechanism; and
FIGURE 6 is a detail of the idler roll.

Referring to the drawings and to FIGURE 1, in particular a reinforcing cage forming machine 10 is shown. The machine 10 comprises a suitable supporting frame 12 on which is mounted the cage forming mechanism. The reinforcing material of the formed cages 11 may be wires or rods. Usually, the rod or wire is made of steel. In the illustrated embodiment in the drawings the reinforcing material is shown as heavy gauge wire which is mounted on supply spools or coils 14.

The number of longitudinal wires 15 used in each of the cages depends upon the design requirements of the user. In the drawings, the illustrated cage is shown as having six longitudinal wires. The longitudinal wires 15 are first fed from the supply coils 14 to wire straighteners 16 which are mounted on the frame 12, the straighteners 16 being comprised of two sets of rollers 18 and 20. The first set of rollers 18 are aligned so that the wire is straightened in a horizontal plane and the second set of rollers 20 straightens the wire in a vertical plane. This wire straightening step has the added advantage of removing scale from the wire, thus permitting hot-rolled wire to be used in place of the more expensive cold-rolled wire.

From the straightener 16, the wires 15 are next fed to a template 22 which positions the wires for utilization in making the finished reinforcing cage 11. Mounted on the template 22 are a series of non-return wire grippers 24 which prevent the wires 15 from passing backwardly from the template 22 to the straightener 16. The number of grippers 24 on the template 22 is determined by the number of longitudinal wires 15 which are to be incorporated into the finished cage 11. Beyond the template 22 is an indexing cylinder 26. The indexing cylinder 26 has a centrally positioned ram 28 which is substantially centered on the longitudinal axis of the cage to be formed. Mounted on the ram 28 is a second template 30 which cooperates with the first template 22 to properly align the longitudinal wires 15. This template 30 may be replaced as desired in order to vary the number of longitudinal wires 15.

As shown in FIGURE 2 in particular, the template 30 has mounted thereon guide tubes 32 through which the longitudinal wires 15 are passed. Also mounted on the tempalte 30 are a series of wire grippers 34 which engage the longitudinal wires 15. When the ram 28 is moved forwardly it carries with it the template 30 and the attached guide tubes 32 and the wire grippers 34. Since the wire grippers 34 engage the longitudinal wires 15, these wires are carried forward with the template 30 and the grippers 34. When the ram 28 is returned to its retracted position, the grippers 34 become disengaged from the longitudinal wires and slide back along the wires 15 without causing the wires to return with the template 30 to the retracted position of the ram 28.

The length of advance of the wires 15 is determined by the length of the stroke of the ram 28. As will be discussed hereinafter, the length of the stroke determines the spacing of the transverse wires.

After the longitudinal wires 15 are passed through the guide tubes 32 and the grippers 34 they are then positioned in a loop or hoop forming guide template 36. This loop or hoop forming guide template 36 is comprised of a substantially circular and vertically aligned guide track 38. A series of openings 40 are provided therein to accommodate the passage therethrough of the longitudinal wires 15. As shown more particularly in FIGURE 3, positioned at each opening 40 in the guide track 38 is an air cylinder 42 with a movable welding tip 44 mounted thereon. Opposite each welding tip 44 is a stationary welding tip 46.

When the longitudinal wires 15 have been advanced through the loop forming guide template 36, a length of wire 47 is drawn from a supply spool 48 and moved through a loop wire feed device 50. The loop wire feed device 50 is comprised of a wire straightener 52 which functions in a manner similar to the longitudinal wire straighteners 16 described hereinbefore, a wire feed mechanism 54 and a cut-off knife 56. The wire 47 is fed from the supply spool 48, through the loop wire feed device 50 and into a wire guide tube 58. When a sufficient length of wire 47 has been passed through the spool 48, through the feed device 50 and into the guide tube 58, the knife 56 is activated cutting off the predetermined length of wire 47 which is then in the guide tube 58.

At this point a wire feed cylinder 60 is activated which pulls the length of loop wire from the guide tube 58 and feeds it into the wire guide track 38. In passing from the wire guide tube 58 the wire 47 is fed through a roller system 62 which serves to position the wire 47 in the guide track 38 and, also, to impart a curvature to the wire 47 which enables it to be looped about the longitudinal wires 15 which are already positioned in the openings 40.

The length of the loop wire 47 is advantageously greater than the circumference of the guide track 38 so that the end portions of the wire 47 overlap.

The roller system 62 is comprised of a pair of driven opposing rollers 64 and 66 and a third roller 68. Roller 64 is a fixed lower roller and roller 66 is a vertically movable upper roller. These rollers 64 and 66 are in close relationship so that they form the drive mechanism for the loop wire 47 and force it through the wire guide track 38. The third roller 68 is an adjustably positionable idler roller which is adjacent to the bight between the rollers 64 and 66. When the loop wire 47 has passed between the rollers 64 and 66 it engages the idler roller 68 so that it is deflected and the proper curvature is imparted to the wire 47.

When the wire 47 is properly positioned in the guide track 38, the trailing end of the wire 47 is held in position by the rollers 64 and 66. Proper positioning is obtained when the overlapping end portions of wire 47 are at station G on the guide track 38 as shown in FIGURE 3. To insure that the end portions of wire 47 overlap at station G a stop 69 is provided between stations G and E. At this point the drive of the rollers 64 and 66 is stopped and the stopped rollers 64 and 66 which engage the trailing end portion of the loop wire 47 hold it in place. Next welding of the longitudinal wires 15 to the loop wire 47 takes place at stations A through F.

In the illustrated embodiment the first welding is done at station A. To accomplish the welding, the air cylinder 42 is activated and clamps the loop wire 47 against the longitudinal wire 15 and between the welding tips 44 and 46. The tips are then used to weld the wires together. The wires are not clamped together at station B until after the wires are clamped together at station A. The clamping together at station C in turn is not completed until the clamping at B is completed. The same is true successively of the clamping at stations D and E.

After the clamping at station E is completed, the rollers 64 and 66 are disengaged by raising roller 66 and the clamping at station F takes place. All the air cylinders 42 at stations A through F continue to clamp the loop wire 47 to the longitudinal wires 15 until the overlapping end portions are welded together at station G.

In actual operation of the illustrated embodiment, welding takes place at each station along with the clamping. If desired and if sufficient electrical power is available welding may be delayed until all the clamping operations are completed.

By progressively clamping each longitudinal wire 15 to the loop wire 47 in a sequential manner, any bows or sags in the loop wire are substantially removed. This permits the loop wire 47 to be substantially conformed to the shape and circumference of the guide track 38. It is very advantageous to have each loop wire shaped and sized substantially the same. By having each loop wire substantially the same the danger of having a portion of the cage protrude from the concrete covering of the finished pipe is greatly eliminated. If the uncovered wire were to protrude corrosion could set in and failure could quickly follow. This is particularly significant with the loop wires since they provide a substantial portion of the circular strength of the finished pipe.

With the loop now welded and completed, the indexing cylinder 26 is activated and the ram 28 drives the longitudinal wires 15 forward again carrying the completed loop out of the wire guide track 38.

Advantageously, the wire guide track 38 has a shallow channel section design so that the loop wire 47 which is compressed to a lesser diameter during the welding operation, clears the flange of the guide track 38 after the loop is completed.

In order to maintain the loop wire in the track 38, and yet permit rapid and sure withdrawal, a series of spring loaded hinged gates 70 may be provided on the track 38. The gates 70 are normally closed forming the front side of the track 38. However, when the ram 28 drives the wires 15 forward the gates 70 yield and permit the loop 47 to move ahead. Advantageously the gates 70 extend between the openings 40 in the track 38 so as not to interfere with the wires 15.

The process of forming further loops is continued as set forth with regard to the first loop until the desired number of loops and the required length of cage is obtained. When this occurs a cut-off mechanism is activated. This mechanism comprises a high speed shaft 74 on which is mounted a cam 76. When the shaft 74 is rotated, the cam 76 causes cam followers 78 to ride upwardly and a pivoted link assembly 80 is opened up so that cut-off wheels 82 engage the longitudinal wires 15 and sever the complete cage from the longitudinal wires passing through the loop forming guide template 36. To support the finished cage a support track or rail 84 is provided.

As shown in FIGURE 5 in particular the driven roller assembly 62 provides positive positioning of the loop wires 47. Each roller 64 and 66 is provided with a pair of matching grooves 86 and 88. Grooves 86 are the outer set and grooves 88 are the inner set. When the wire 47 emerges from the guide tube it passes into the opening 90 formed by grooves 86. From there it passes over the idler roll 68 and into the track 38, the curvature of the wire 47 being obtained by this combination of elements. The wire 47 continues to travel in the track 38 in the direction of arrow 92. After it has passed station A it moves into an open guide 94 between rollers 64 and 66. The opening 94 is formed by the grooves 88. The rollers continue to drive the wire 47 until its leading end hits stop 69. At this point the drive is stopped and the wire 47 is applied to the longitudinal wires 15 as discussed previously.

From the foregoing it will be seen that the present invention accomplishes the advantages and objects set forth hereinbefore as well as others which are obvious from the description of the illustrated embodiment.

I claim:

1. Apparatus for forming cylindrical reinforcing cages for concrete pipes comprising a supply of reinforcing elements, means for positioning a plurality of longitudinal reinforcing elements about the periphery of the cage cylinder to be formed, a mechanism for looping a length of transverse reinforcing element into a cylindrical guide positioned about the longitudinal elements, welding means for securing each of the longitudinal elements in succession to the transverse element and welding the transverse element into an endless loop, and advancing mechanism for moving all the longitudinal elements with the affixed transverse whereby a second loop spaced from the first may be affixed to the longitudinal members.

2. Apparatus as defined in claim 1 wherein the looping mechanism includes a driven roller system whereby said transverse element may be advanced by the roller system and positioned in the cylindrical guide.

3. Apparatus as defined in claim 1 wherein the looping mechanism includes a driven roller system and the guide has openings therethrough for the longitudinal elements whereby said transverse element may be advanced by the roller system and positioned in the guide and about the longitudinal members.

4. Apparatus as defined in claim 1 wherein the cylindrical guide has a plurality of swingable gates thereon and adapted to be activated by the forward movement of the affixed transverse element whereby said element may be moved from the guide.

References Cited by the Examiner
UNITED STATES PATENTS

| | | | |
|---|---|---|---|
| 689,578 | 12/1901 | Dice | 140—88 |
| 2,050,832 | 8/1936 | Edwards | 140—112 |
| 3,125,132 | 3/1964 | Knisely | 140—71 |

CHARLES W. LANHAM, *Primary Examiner.*

RICHARD J. HERBST, *Examiner.*

W. H. JUST, F. I. SMITH, *Assistant Examiners.*